US012603883B2

(12) United States Patent
Rule et al.

(10) Patent No.: US 12,603,883 B2
(45) Date of Patent: *Apr. 14, 2026

(54) ESTABLISHING AUTHENTICATION PERSISTENCE

(71) Applicant: Capital One Services, LLC, McLean, VA (US)

(72) Inventors: Jeffrey Rule, Chevy Chase, MD (US); Paul Moreton, Glen Allen, VA (US); Thomas Poole, Chantilly, VA (US)

(73) Assignee: Capital One Services, LLC., McLean, VA (US)

( * ) Notice: Subject to any disclaimer, the term of this patent is extended or adjusted under 35 U.S.C. 154(b) by 235 days.

This patent is subject to a terminal disclaimer.

(21) Appl. No.: 18/124,868

(22) Filed: Mar. 22, 2023

(65) Prior Publication Data

US 2023/0224297 A1 Jul. 13, 2023

Related U.S. Application Data

(63) Continuation of application No. 17/183,888, filed on Feb. 24, 2021, now Pat. No. 11,637,826.

(51) Int. Cl.
H04L 29/06 (2006.01)
H04L 9/08 (2006.01)
(Continued)

(52) U.S. Cl.
CPC ........ H04L 63/0861 (2013.01); H04L 9/0869 (2013.01); H04L 9/3226 (2013.01);
(Continued)

(58) Field of Classification Search
None
See application file for complete search history.

(56) References Cited

U.S. PATENT DOCUMENTS 5,590,038 A 12/1996 Pitroda
5,666,415 A 9/1997 Kaufman
(Continued)

FOREIGN PATENT DOCUMENTS

CN 101192295 A 6/2008
GB 2516861 A 2/2015
(Continued)

OTHER PUBLICATIONS

Author Unknown, "Global expansion of card tapping mobile OTP for security and convenience is imminent," Jun. 28, 2022, website: https://www.swidch.com/blogs/card-tapping-motp-blog.
(Continued)

*Primary Examiner* — Piotr Poltorak
(74) *Attorney, Agent, or Firm* — KDW FIRM PLLC

(57) ABSTRACT

Various embodiments are generally directed to performing an authentication persistence check and, based on the check, allowing a previously successful authentication to persist on a user apparatus. The check may involve a stability check on the user apparatus. If the user apparatus is stable, device fingerprinting on the apparatus may be performed, the result of which may be compared to a snapshot of apparatus taken at the time of successful authentication. If the comparison reveals changes or drifts that are within a predetermined threshold, then the persistence of the authentication is allowed.

14 Claims, 12 Drawing Sheets

(51) Int. Cl.
　　*H04L 9/32*　　　(2006.01)
　　*H04L 9/40*　　　(2022.01)
(52) U.S. Cl.
　　CPC ........ *H04L 9/3242* (2013.01); *H04L 63/0876*
　　　　　(2013.01); *H04L 63/20* (2013.01); *H04L*
　　　　　　　　　　　　　　　*2463/082* (2013.01)

(56) References Cited

U.S. PATENT DOCUMENTS

| | | | |
|---|---|---|---|
| 6,199,114 B1 | 3/2001 | White | |
| 6,324,271 B1 | 11/2001 | Sawyer | |
| 6,367,011 B1 | 4/2002 | Lee | |
| 6,572,015 B1 | 6/2003 | Norton | |
| 7,252,242 B2 | 8/2007 | Ho | |
| 7,270,276 B2 | 9/2007 | Vayssiere | |
| 7,287,692 B1 | 10/2007 | Patel | |
| 7,374,099 B2 | 5/2008 | de Jong | |
| 7,527,208 B2 | 5/2009 | Hammad | |
| 7,568,631 B2 | 8/2009 | Gibbs | |
| 7,584,153 B2 | 9/2009 | Brown | |
| 7,628,322 B2 | 12/2009 | Holtmanns | |
| 7,793,851 B2 | 9/2010 | Mullen | |
| 7,801,799 B1 | 9/2010 | Brake, Jr. | |
| 7,908,216 B1 | 3/2011 | Davis | |
| 7,922,082 B2 | 4/2011 | Muscato | |
| 8,010,405 B1 | 8/2011 | Bortolin | |
| 8,074,877 B2 | 12/2011 | Mullen | |
| 8,082,450 B2 | 12/2011 | Frey | |
| 8,108,687 B2 | 1/2012 | Ellis | |
| 8,186,602 B2 | 5/2012 | Itay | |
| 8,196,131 B1 | 6/2012 | von Behren | |
| 8,249,654 B1 | 8/2012 | Zhu | |
| 8,276,814 B1 | 10/2012 | Davis | |
| 8,332,272 B2 | 12/2012 | Fisher | |
| 8,346,670 B2 | 1/2013 | Hasson | |
| 8,511,547 B2 | 8/2013 | Rans | |
| 8,519,822 B2 | 8/2013 | Riegebauer | |
| 8,750,514 B2 | 6/2014 | Gallo | |
| 8,870,081 B2 | 10/2014 | Olson | |
| 9,038,893 B2 | 5/2015 | Kirkham | |
| 9,129,199 B2 | 9/2015 | Spodak | |
| 9,183,490 B2 | 11/2015 | Moreton | |
| 9,275,325 B2 | 3/2016 | Newcombe | |
| 9,286,606 B2 | 3/2016 | Diamond | |
| 9,306,753 B1 | 4/2016 | Vandervort | |
| 9,501,776 B2 | 11/2016 | Martin | |
| 9,516,010 B1* | 12/2016 | Avital | H04W 4/80 |
| 9,710,744 B2 | 7/2017 | Wurmfeld | |
| 9,949,065 B1 | 4/2018 | Zarakas | |
| 9,965,632 B2 | 5/2018 | Zarakas | |
| 9,965,911 B2 | 5/2018 | Wishne | |
| 9,977,890 B2 | 5/2018 | Alberti | |
| 9,978,056 B2 | 5/2018 | Seo | |
| 9,978,058 B2 | 5/2018 | Wurmfeld | |
| 9,990,795 B2 | 6/2018 | Wurmfeld | |
| 10,007,873 B2 | 6/2018 | Heo | |
| 10,013,693 B2 | 7/2018 | Wyatt | |
| 10,121,130 B2 | 11/2018 | Pinski | |
| 10,210,505 B2 | 2/2019 | Zarakas | |
| 10,242,368 B1 | 3/2019 | Poole | |
| 10,296,910 B1 | 5/2019 | Templeton | |
| 10,332,102 B2 | 6/2019 | Zarakas | |
| 10,360,557 B2 | 7/2019 | Locke | |
| 10,380,471 B2 | 8/2019 | Locke | |
| 10,395,244 B1 | 8/2019 | Mossler | |
| 10,453,054 B2 | 10/2019 | Zarakas | |
| 10,474,941 B2 | 11/2019 | Wurmfeld | |
| 10,475,027 B2 | 11/2019 | Guise | |
| 10,482,453 B2 | 11/2019 | Zarakas | |
| 10,482,457 B2 | 11/2019 | Poole | |
| 10,489,774 B2 | 11/2019 | Zarakas | |
| 10,489,781 B1 | 11/2019 | Osborn | |
| 10,510,070 B2 | 12/2019 | Wurmfeld | |
| 10,515,361 B2 | 12/2019 | Zarakas | |
| 10,535,068 B2 | 1/2020 | Locke | |
| 10,546,444 B2 | 1/2020 | Osborn | |
| 10,581,611 B1 | 3/2020 | Osborn | |
| 10,664,830 B1 | 5/2020 | Rule | |
| 10,685,349 B2 | 6/2020 | Brickell | |
| 10,797,882 B2 | 10/2020 | Rule | |
| 10,880,741 B2 | 12/2020 | Zarakas | |
| 10,909,525 B1 | 2/2021 | Dhodapkar | |
| 10,970,691 B2 | 4/2021 | Koeppel | |
| 10,984,416 B2 | 4/2021 | Ilincic | |
| 11,037,136 B2 | 6/2021 | Rule | |
| 11,062,098 B1 | 7/2021 | Bergeron | |
| 11,120,453 B2 | 9/2021 | Rule | |
| 11,138,593 B1 | 10/2021 | Ho | |
| 11,138,605 B2 | 10/2021 | Aabye | |
| 11,176,540 B2 | 11/2021 | Gupta | |
| 11,188,908 B2 | 11/2021 | Locke | |
| 11,216,806 B2 | 1/2022 | Mossler | |
| 11,297,958 B2 | 4/2022 | Vukich | |
| 11,334,872 B2 | 5/2022 | Phillips | |
| 11,361,173 B2 | 6/2022 | Edwards | |
| 11,392,933 B2 | 7/2022 | Mossler | |
| 11,392,935 B2 | 7/2022 | Suresh | |
| 11,416,844 B1 | 8/2022 | Osterkamp | |
| 11,423,392 B1 | 8/2022 | Ho | |
| 11,443,292 B2 | 9/2022 | Sherif | |
| 11,444,770 B2 | 9/2022 | Wieker | |
| 11,461,764 B2 | 10/2022 | Rule | |
| 11,481,764 B2 | 10/2022 | Shakkarwar | |
| 11,521,213 B2 | 12/2022 | Rule | |
| 11,551,200 B1 | 1/2023 | Cook | |
| 11,556,918 B2 | 1/2023 | Mestre | |
| 11,615,395 B2 | 3/2023 | McHugh | |
| 11,777,933 B2 | 10/2023 | Moreton | |
| 2003/0220876 A1 | 11/2003 | Burger | |
| 2005/0156026 A1 | 7/2005 | Ghosh | |
| 2005/0228997 A1 | 10/2005 | Bicker | |
| 2005/0269402 A1 | 12/2005 | Spitzer | |
| 2006/0294236 A1* | 12/2006 | Bar-El | G06F 21/575 |
| | | | 709/225 |
| 2007/0276765 A1 | 11/2007 | Hazel | |
| 2008/0082452 A1 | 4/2008 | Wankmueller | |
| 2008/0099552 A1 | 5/2008 | Grillion | |
| 2009/0143104 A1 | 6/2009 | Loh | |
| 2009/0235339 A1 | 9/2009 | Mennes | |
| 2009/0282264 A1 | 11/2009 | Amiel | |
| 2011/0099362 A1* | 4/2011 | Haga | H04L 9/0897 |
| | | | 380/284 |
| 2011/0113245 A1 | 5/2011 | Varadarajan | |
| 2011/0155801 A1 | 6/2011 | Rowberry | |
| 2011/0202466 A1* | 8/2011 | Carter | H04W 4/023 |
| | | | 705/67 |
| 2012/0143703 A1 | 6/2012 | Wall | |
| 2012/0206414 A1* | 8/2012 | Tada | G06F 3/0346 |
| | | | 345/173 |
| 2013/0030997 A1 | 1/2013 | Spodak | |
| 2013/0146657 A1 | 6/2013 | Graef | |
| 2013/0211937 A1 | 8/2013 | Elbirt | |
| 2013/0311363 A1 | 11/2013 | Ramaci | |
| 2014/0074637 A1 | 3/2014 | Hammad | |
| 2014/0074655 A1 | 3/2014 | Lim | |
| 2014/0081785 A1 | 3/2014 | Valadas Preto | |
| 2014/0365377 A1 | 12/2014 | Salama | |
| 2015/0032635 A1 | 1/2015 | Guise | |
| 2015/0073983 A1 | 3/2015 | Bartenstein | |
| 2015/0113271 A1 | 4/2015 | Jooste | |
| 2015/0134513 A1 | 5/2015 | Olson | |
| 2015/0199673 A1 | 7/2015 | Savolainen | |
| 2015/0199863 A1 | 7/2015 | Scoggins | |
| 2015/0254637 A1 | 9/2015 | Yang | |
| 2015/0317295 A1 | 11/2015 | Sherry | |
| 2015/0341327 A1* | 11/2015 | Barton | G06F 21/36 |
| | | | 713/168 |
| 2015/0347859 A1* | 12/2015 | Dixon | G06V 30/2253 |
| | | | 382/138 |
| 2016/0078430 A1 | 3/2016 | Douglas | |
| 2016/0189143 A1 | 6/2016 | Koeppel | |
| 2016/0253651 A1 | 9/2016 | Park | |
| 2016/0277383 A1 | 9/2016 | Guyomarc'h | |
| 2016/0307189 A1 | 10/2016 | Zarakas | |

(56) References Cited

U.S. PATENT DOCUMENTS

| | | | |
|---|---|---|---|
| 2016/0314472 A1 | 10/2016 | Ashfield | |
| 2016/0379217 A1 | 12/2016 | Hammad | |
| 2017/0017957 A1 | 1/2017 | Radu | |
| 2017/0039566 A1 | 2/2017 | Schipperheijn | |
| 2017/0068950 A1 | 3/2017 | Kwon | |
| 2017/0330173 A1 | 11/2017 | Woo | |
| 2018/0039987 A1 | 2/2018 | Molino | |
| 2018/0083963 A1 | 3/2018 | Bharat et al. | |
| 2018/0268132 A1 | 9/2018 | Buer | |
| 2018/0300716 A1 | 10/2018 | Carlson | |
| 2019/0172055 A1 | 6/2019 | Hale | |
| 2019/0207927 A1 | 7/2019 | Lakahani et al. | |
| 2019/0303945 A1 | 10/2019 | Mitra | |
| 2020/0211080 A1* | 7/2020 | Frederick | G06Q 30/0251 |
| 2020/0322330 A1 | 10/2020 | Robert et al. | |
| 2021/0004806 A1 | 1/2021 | Noe | |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |
| 2023/0419328 A1* | 12/2023 | Lowe | G06Q 20/353 |

FOREIGN PATENT DOCUMENTS

| | | | |
|---|---|---|---|
| GB | 2551907 A | | 1/2018 |
| GB | 2611806 | * | 10/2021 |
| JP | 2022300655 A | | 10/2002 |
| JP | 2016521403 A | | 7/2016 |
| JP | 2018014099 A | | 1/2018 |
| KR | 20150140132 A | | 12/2015 |
| WO | 9910824 A1 | | 3/1999 |
| WO | 0049586 A1 | | 8/2000 |
| WO | 2013155562 A1 | | 10/2013 |
| WO | 2015183818 A1 | | 12/2015 |
| WO | 2017047855 A1 | | 3/2017 |
| WO | 2019022585 A1 | | 1/2019 |
| WO | 2021011354 A1 | | 1/2021 |
| WO | 2021051884 A1 | | 3/2021 |
| WO | 2021133492 A1 | | 7/2021 |
| WO | 2022108959 A1 | | 5/2022 |
| WO | 2022187350 A1 | | 9/2022 |
| WO | 2023017943 A1 | | 2/2023 |
| WO | 2023064063 A1 | | 4/2023 |

OTHER PUBLICATIONS

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

EMVCo, LLC, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

EMVCo, LLC, "EMV Card Personalisation Specification," Aug. 1, 2021, retrieved from the Internet URL: https://www.emvco.com/specification/?post_id=12467, 114 pages.

EMVCo, LLC, "EMV Card Personalization Specification," Specifcation version 1.0, (2003) 81 pages.

EMVCo, LLC, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_2016080902325 . . . , 52 pages.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

100

105
Contactless Card

110
Client Device

115
Network

120
Server

200

Figure 4:
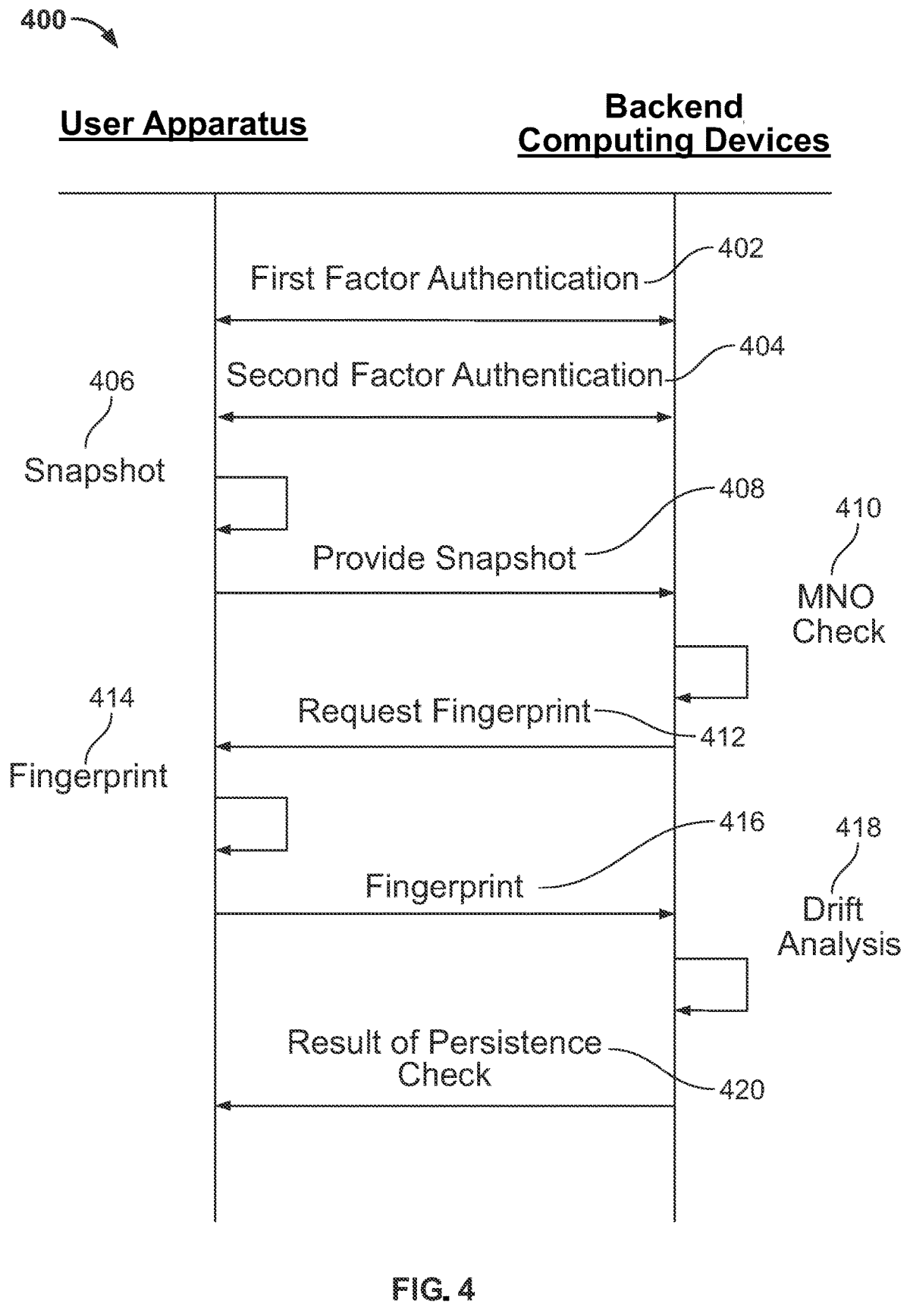

400

User Apparatus

Backend Computing Devices

First Factor Authentication — 402

Second Factor Authentication — 404

406

Snapshot

Provide Snapshot — 408

410

MNO Check

414

Request Fingerprint — 412

Fingerprint

Fingerprint — 416

418

Drift Analysis

Result of Persistence Check — 420

Figure 6:
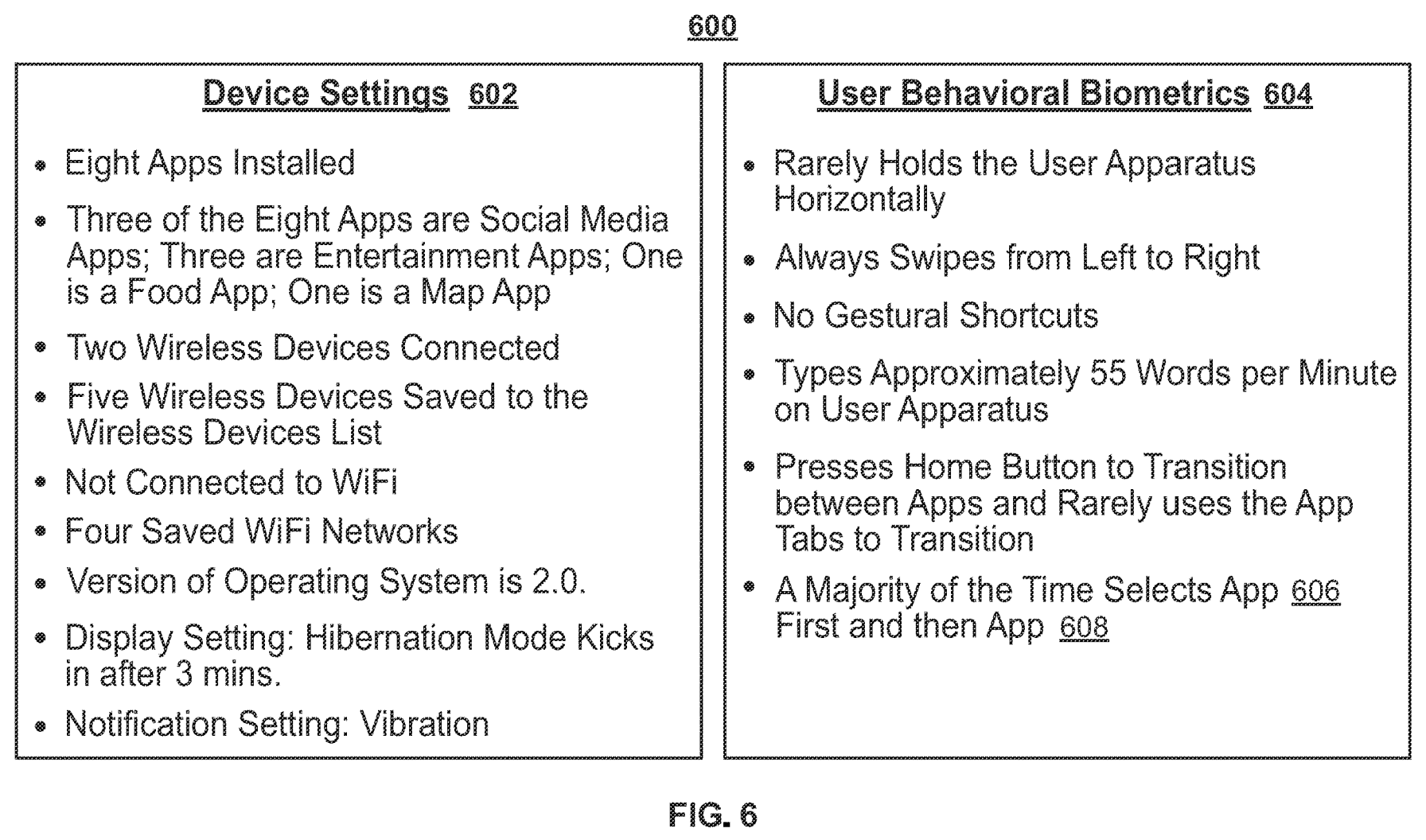

Device Settings  602

- Eight Apps Installed
- Three of the Eight Apps are Social Media Apps; Three are Entertainment Apps; One is a Food App; One is a Map App
- Two Wireless Devices Connected
- Five Wireless Devices Saved to the Wireless Devices List
- Not Connected to WiFi
- Four Saved WiFi Networks
- Version of Operating System is 2.0.
- Display Setting: Hibernation Mode Kicks in after 3 mins.
- Notification Setting: Vibration

User Behavioral Biometrics  604

- Rarely Holds the User Apparatus Horizontally
- Always Swipes from Left to Right
- No Gestural Shortcuts
- Types Approximately 55 Words per Minute on User Apparatus
- Presses Home Button to Transition between Apps and Rarely uses the App Tabs to Transition
- A Majority of the Time Selects App 606 First and then App 608

Figure 8:
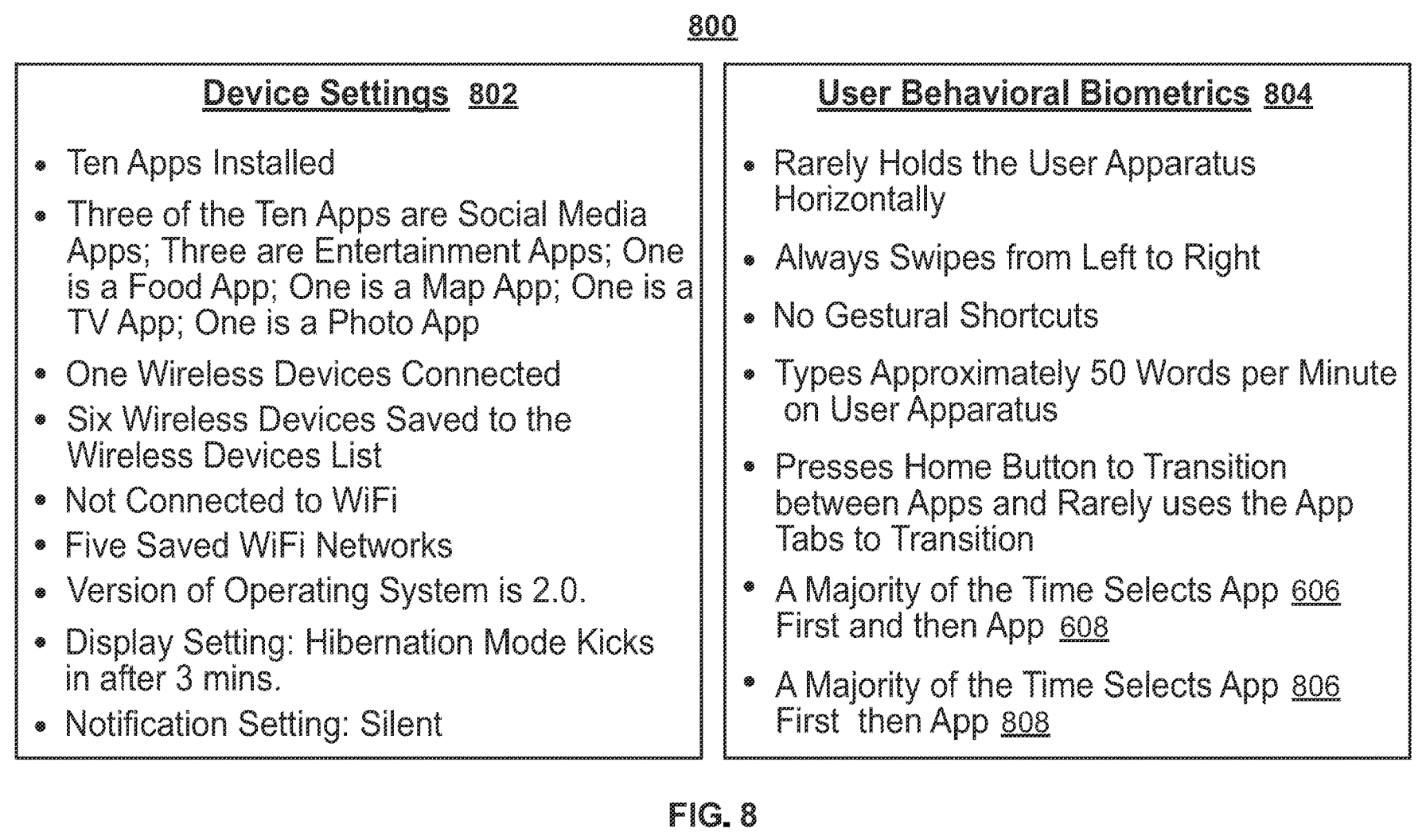

Device Settings  802

- Ten Apps Installed

- Three of the Ten Apps are Social Media Apps; Three are Entertainment Apps; One is a Food App; One is a Map App; One is a TV App; One is a Photo App

- One Wireless Devices Connected

- Six Wireless Devices Saved to the Wireless Devices List

- Not Connected to WiFi

- Five Saved WiFi Networks

- Version of Operating System is 2.0.

- Display Setting: Hibernation Mode Kicks in after 3 mins.

- Notification Setting: Silent

User Behavioral Biometrics  804

- Rarely Holds the User Apparatus Horizontally

- Always Swipes from Left to Right

- No Gestural Shortcuts

- Types Approximately 50 Words per Minute on User Apparatus

- Presses Home Button to Transition between Apps and Rarely uses the App Tabs to Transition

- A Majority of the Time Selects App 606 First and then App 608

- A Majority of the Time Selects App 808 First then App 808

| Device Settings 602 | User Behavioral Biometrics 604 |
|---|---|
| • Eight Apps Installed<br><br>• Three of the Eight Apps are Social Media Apps; Three are Entertainment Apps; One is a Food App; One is a Map App<br><br>• Two Wireless Devices Connected<br><br>• Five Wireless Devices Saved to the Wireless Devices List<br><br>• Not Connected to WiFi<br><br>• Four Saved WiFi Networks<br><br>• Version of Operating System is 2.0.<br><br>• Display Setting: Hibernation Mode Kicks in after 3 mins.<br><br>• Notification Setting: Vibration | • Rarely Holds the User Apparatus Horizontally<br><br>• Always Swipes from Left to Right<br><br>• No Gestural Shortcuts<br><br>• Types Approximately 55 Words per Minute on User Apparatus<br><br>• Presses Home Button to Transition between Apps and Rarely uses the App Tabs to Transition<br><br>• A Majority of the Time Selects App 606 First and then App 608 |

| Device Settings 802 | User Behavioral Biometrics 804 |
|---|---|
| • Ten Apps Installed<br><br>• Three of the Ten Apps are Social Media Apps; Three are Entertainment Apps; One is a Food App; One is a Map App; One is a TV App; One is a Photo App<br><br>• One Wireless Devices Connected<br><br>• Six Wireless Devices Saved to the Wireless Devices List<br><br>• Not Connected to WiFi<br><br>• Five Saved WiFi Networks<br><br>• Version of Operating System is 2.0.<br><br>• Display Setting: Hibernation Mode Kicks in after 3 mins.<br><br>• Notification Setting: Silent | • Rarely Holds the User Apparatus Horizontally<br><br>• Always Swipes from Left to Right<br><br>• No Gestural Shortcuts<br><br>• Types Approximately 50 Words per Minute on User Apparatus<br><br>• Presses Home Button to Transition between Apps and Rarely uses the App Tabs to Transition<br><br>• A Majority of the Time Selects App 606 First and then App 608<br><br>• A Majority of the Time Selects App 806 First then App 808 |

First and Second Factor Authentications

1004

Take Snapshot of User Apparatus

1006

Cause Stability Check to be Performed

1008

Perform Device Fingerprinting

1010

Second Factor Authentication Persistence Allowed or Reauthentication Required

ESTABLISHING AUTHENTICATION PERSISTENCE

This application is a continuation of U.S. patent application Ser. No. 17/183,888. Filed Feb. 24, 2021, the disclosure of which is incorporated herein by reference in its entirety.

BACKGROUND

Background

Authentication may be the act of proving or verifying an assertion, such as an identity of a user of a computing device. The ways in which the user is authenticated may fall into three categories based on what are known as the factors of authentication: something that the user knows, something the user has, and something the user is. Each authentication factor may cover a range of elements used to authenticate or verify the user's identity prior to being granted access, approving a request, signing a document or other work product, granting authority to others, establishing chain of authority, etc.

SUMMARY

Various embodiments are generally directed to performing an authentication persistence check and, based on the check, allowing a previously successful authentication to persist on a user apparatus. The check may involve a stability check on the user apparatus. If the user apparatus is stable, device fingerprinting on the apparatus may be performed, the result of which may be compared to a snapshot of apparatus taken at the time of successful authentication. If the comparison reveals changes or drifts that are within a predetermined threshold, then the persistence of the authentication may be allowed.

BRIEF DESCRIPTION OF THE DRAWINGS

FIG. 4 illustrates an example timing diagram in accordance with one or more embodiments.

FIG. 6 illustrates an example snapshot of the device settings and user behavioral biometrics in accordance with one or more embodiments.

FIG. 8 illustrates an example device fingerprinting in accordance with one or more embodiments.

FIG. 9 illustrates an example drift analysis in accordance with one or more embodiments.

DETAILED DESCRIPTION

Figure 1A:
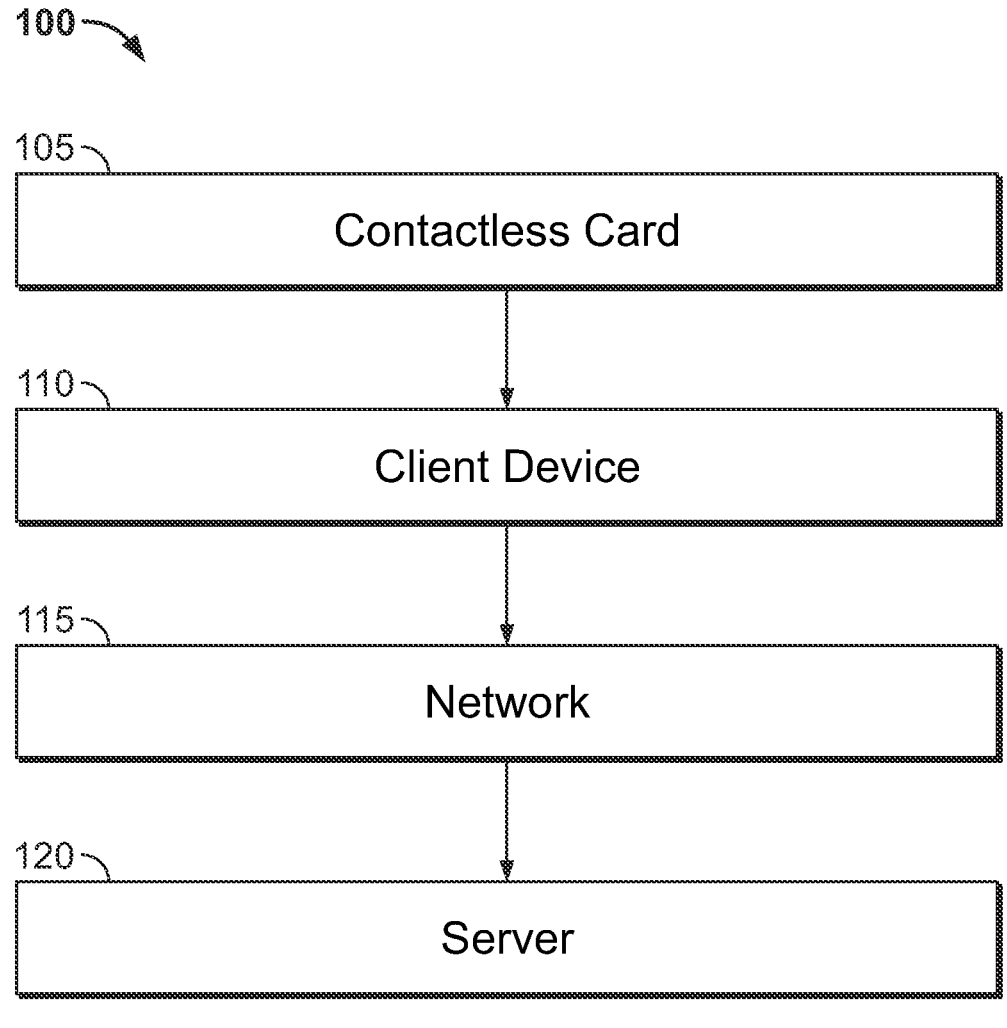
FIG. 1A illustrates an example data transmission system in accordance with one or more embodiments.

Various embodiments are generally directed to performing an authentication persistence check on a user apparatus (e.g., mobile computing device), and based on a positive persistence check, allowing a previously successful authentication (e.g., first factor authentication, second factor authentication) to persist for a predetermined period of time. For example, the authentication persistence check may be triggered or caused by one or more factors, such as a passing of a specific amount of time after a first instance of the authentication or when an authentication event occurs, which may include any action or instance that would typically require an authentication to be performed or processed, e.g., high-risk action or behavior, risk level of user action.

According to embodiments, the authentication persistence check may be considered positive if: (i) the user apparatus is stable based on a stability check and (ii) device settings of the user apparatus and/or behavioral biometrics associated with the user are within a predetermined drift threshold. Based on a positive persistence check, the previously successful authentication may persist for the predetermined period of time, and thus, does not require the user to reauthenticate. If, however, the persistence check is negative, the user would be required to reauthenticate.

After the predetermined period of time has passed since the positive authentication persistence check or when a subsequent authentication event occurs, a subsequent persistence check may be performed to determine if the authentication can continue to persist. In some instances, the number of consecutive positive persistence checks may be limited, and thus, the user may be required to reauthenticate after that limit has been reached.

According to embodiments, the types of authentication that can persist may include first factor authentication and second factor authentication, where the first factor and second factor authentications may be different from each other. For instance, the first factor authentication process may require the authenticating user to know something, such as a login ID and password. The second factor authentication may require the authenticating user to possess and utilize something, such as a contactless smart card.

In examples, the second factor authentication may involve the user tapping a contactless card to the user apparatus such that near field communication (NFC) is established between the apparatus and the contactless card. The user apparatus may receive encrypted authentication information from the contactless card via an NFC reader, send the authentication information to one or more remote authentication servers, and receive from the authentication servers an indication that the user is verified and authenticated.

At time of successful authentication, one or more device settings of the user apparatus and/or one or more user behavioral biometrics associated with the use of or interaction with the user apparatus may be determined. This may be referred to or described herein as taking a "snapshot" of a "constellation" of the various device settings and user behavioral biometrics. As will be further described below, the snapshot may be used as a reference point for determining how much the device settings and/or user behavioral biometrics have drifted, deviated, or changed at the time of the authentication persistence check. The allotted degree of drift, deviation, or change may be referred to herein as the predetermined drift threshold.

When the authentication persistence check is triggered, a stability check may be performed on the user apparatus. For example, the stability check may be a mobile network operator (MNO) verification, which may involve verifying or checking with the appropriate MNO(s) that the user apparatus has not substantially changed (e.g., has not changed SIM cards, has not changed phone numbers, has not changed owners, etc.) so as to at least confirm that the user apparatus still belongs to and is associated with the user.

In response to the user apparatus having passed the stability check or otherwise being stable, a device finger-printing of the user apparatus may be performed. Device fingerprinting may be process in which a current constellation of the device settings and/or user behavioral biometrics corresponding to the user apparatus is determined. In at least that regard, device fingerprinting may be similar to the process of taking the snapshot at the time of successful authentication, as described above.

According to further embodiments, it may be determined whether the current constellation of the device settings and/or user behavioral biometrics provided by the device fingerprinting is within the predetermined drift threshold. If within the drift threshold, the authentication may be allowed to persist. If outside the drift threshold, the user may be required to reauthenticate, and in some examples, reauthenticate via both the first and second factor authentications.

In previous solutions, each instance of authentication required the user to manually perform authentication-related acts to complete the authentication process, which would cause user annoyance and friction between the user and platform. The embodiments and examples described herein are advantageous over conventional solutions in various ways. For example, authentication may be allowed to auto-matically persist based on a positive authentication persis-tence check in a highly secure manner, which makes the authentication process convenient for the user and improves overall quality of user experience.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be prac-ticed without these specific details. In other instances, well-known structures and devices are shown in block diagram form to facilitate a description thereof. The intention is to cover all modification, equivalents, and alternatives within the scope of the claims.

FIG. 1A illustrates an example data transmission system according to one or more embodiments. As further discussed below, system 100 may include contactless card 105, client device 110, network 115, and server 120. Although FIG. 1A illustrates single instances of the components, system 100 may include any number of components.

System 100 may include one or more contactless cards 105, which are further explained below with reference to FIG. 3A and FIG. 3B. In some embodiments, contactless card 105 may be in wireless communication, utilizing NFC in an example, with client device 110.

System 100 may include client device 110, which may be a network-enabled computer. As referred to herein, a net-work-enabled computer may include, but is not limited to a computer device, or communications device including, e.g., a server, a network appliance, a personal computer, a work-station, a phone, a smartphone, a handheld PC, a personal digital assistant, a thin client, a fat client, an Internet browser, or other device. Client device 110 also may be a mobile computing device, for example, an iPhone, iPod, iPad from Apple® or any other suitable device running Apple's iOS® operating system, any device running Microsoft's Windows® Mobile operating system, any device running Google's Android® operating system, and/or any other suitable mobile computing device, such as a smartphone, a tablet, or like wearable mobile device.

The client device 110 device can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as nec-essary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is avail-able and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 110 of system 100 may execute one or more applications, such as software appli-cations, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network and may be configured to connect client device 110 to server 120. For example, network 115 may include one or more of a fiber optics network, a passive optical network, a cable network, an Internet network, a satellite network, a wireless local area network (LAN), a Global System for Mobile Communica-tion, a Personal Communication Service, a Personal Area Network, Wireless Application Protocol, Multimedia Mes-saging Service, Enhanced Messaging Service, Short Mes-sage Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 802.3, a wide area network, a wireless personal area network, a LAN, or a global network such as the Internet. In addition, network 115 may support an Internet network, a wireless communi-cation network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to memory. Server 120 may be configured as a central system, server or platform to control and call various data at different times to execute a plurality of workflow actions. Server 120 may be configured to connect to the one or more databases. Server 120 may be connected to at least one client device 110.

Figure 1B:
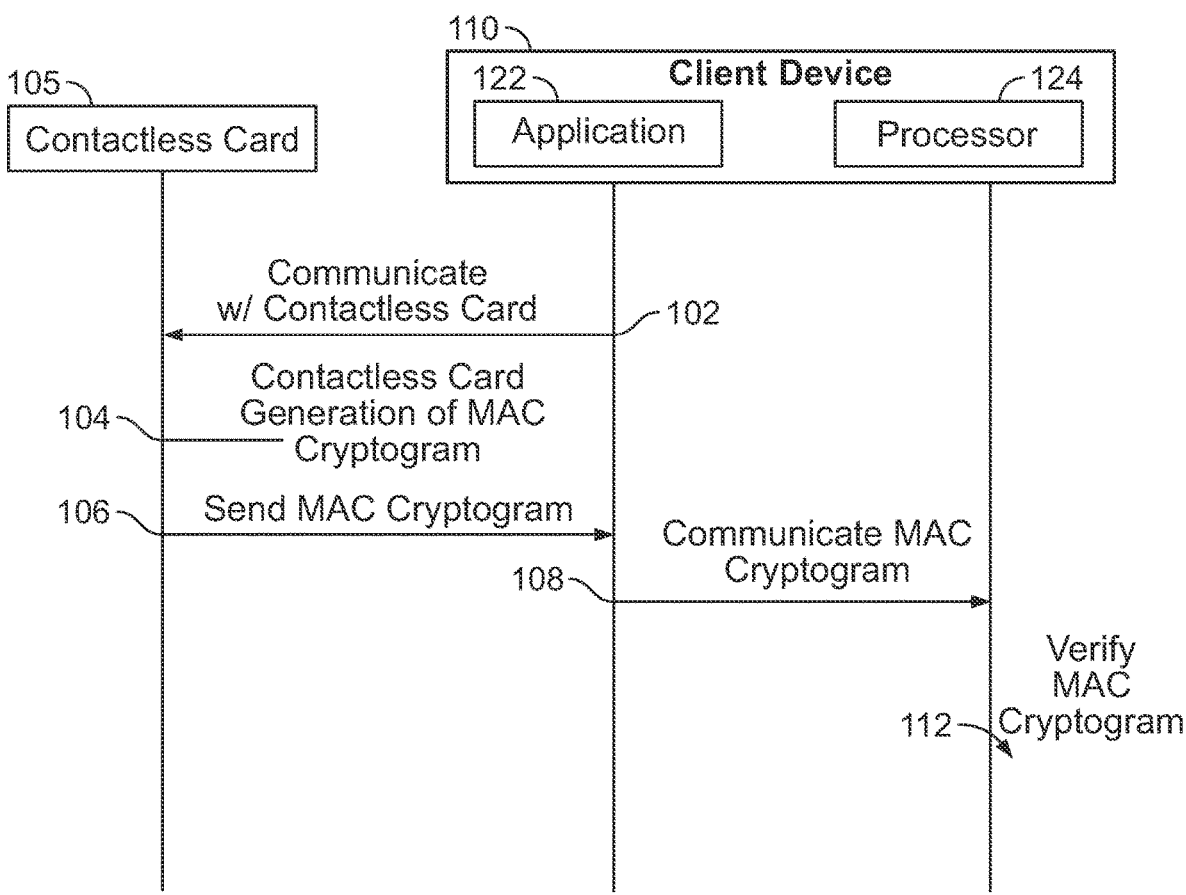
FIG. 1B illustrates an example sequence diagram for providing authenticated access in accordance with one or more embodiments.

FIG. 1B illustrates an example sequence diagram for providing authenticated access according to one or more embodiments. The diagram may include contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format.

For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file," "Read Capabilities file," and "Select NDEF file." At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124. At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a server 120 in data communication with the client device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

It may be understood that in some examples, the contactless card 105 may initiate communication after the contactless card is brought near the client device 110. By way of example, the contactless card 105 may send the client device 110 a message, for instance, indicating that the contactless card has established communication. Thereafter, the application 122 of client device 110 may proceed to communicate with the contactless card at step 102, as described above.

Figure 2:
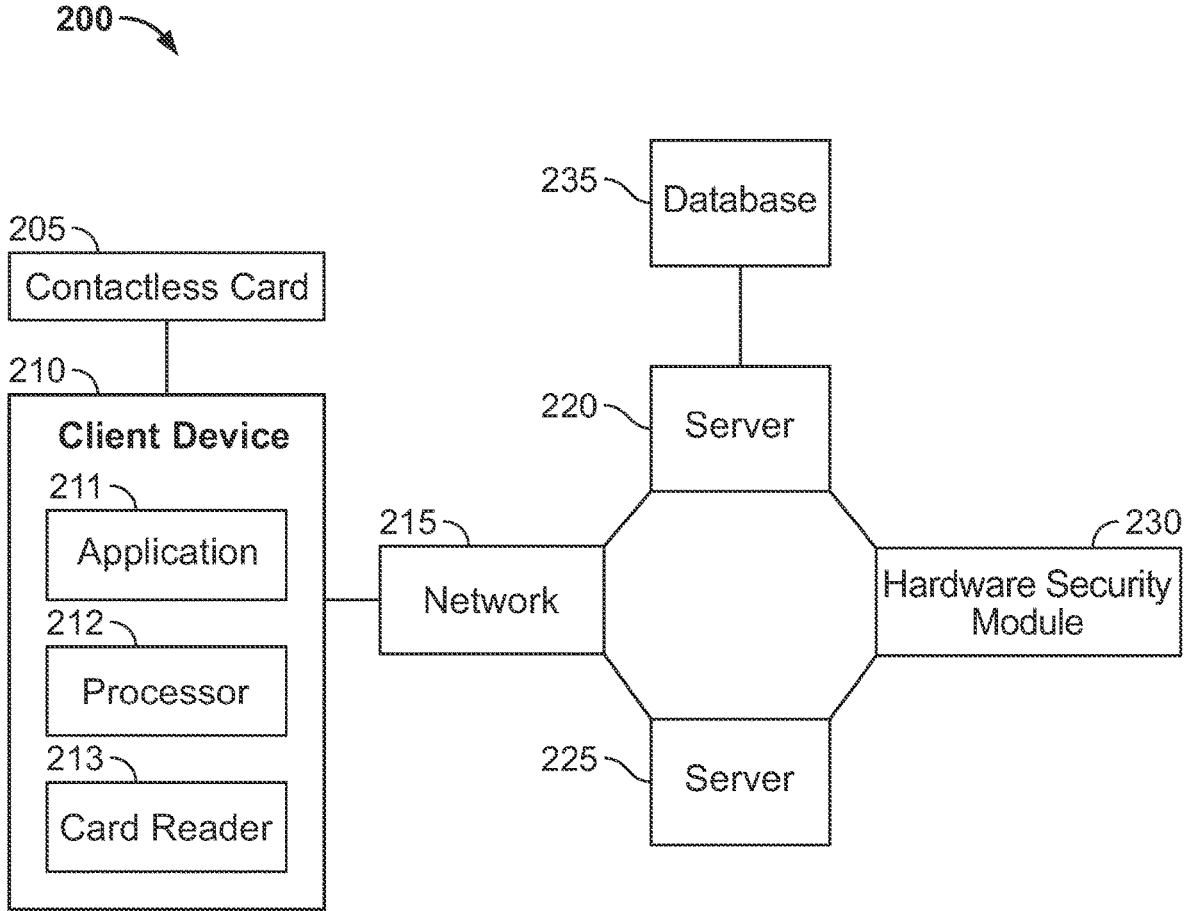
FIG. 2 illustrates an example system using a contactless card in accordance with one or more embodiments.

FIG. 2 illustrates an example system 200 using a contactless card. System 200 may include a contactless card 205, one or more client devices 210, network 215, servers 220, 225, one or more hardware security modules 230, and a database 235. Although FIG. 2 illustrates single instances of the components, system 200 may include any number of components.

System 200 may include one or more contactless cards 205, which are further explained below with respect to FIG. 3A and FIG. 3B. In some examples, contactless card 205 may be in wireless communication, for example NFC, with client device 210. For example, contactless card 205 may include one or more chips, such as a radio frequency identification chip, configured to communication via NFC or other short-range protocols. In other embodiments, contactless card 205 may communicate with client device 210 through other means including, but not limited to, Bluetooth, satellite, Wi-Fi, wired communications, and/or any combination of wireless and wired connections. According to some embodiments, contactless card 205 may be configured to communicate with card reader 213 (which may otherwise be referred to herein as NFC reader, NFC card reader, or reader) of client device 210 through NFC when contactless card 205 is within range of card reader 213. In other examples, communications with contactless card 205 may be accomplished through a physical interface, e.g., a universal serial bus interface or a card swipe interface.

System 200 may include client device 210, which may be a network-enabled computer. As referred to herein, a network-enabled computer may include, but is not limited to:

e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, a client device 110 as described with reference to FIG. 1A or FIG. 1B.

Client device 210 may be in communication with one or more servers 220 and 225 via one or more networks 215. Client device 210 may transmit, for example from an application 211 executing on client device 210, one or more requests to one or more servers 220 and 225. The one or more requests may be associated with retrieving data from one or more servers 220 and 225. Servers 220 and 225 may receive the one or more requests from client device 210. Based on the one or more requests from client device 210, one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests.

System 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead are maintained within the HSM 230. For example, one or more HSMs 230 may be configured to perform at least one of key derivations, decryption, and MAC operations. The one or more HSMs 230 may be contained within, or may be in data communication with, servers 220 and 225.

System 200 may include one or more networks 215. In some examples, network 215 may be one or more of a wireless network, a wired network or any combination of wireless network and wired network, and may be configured to connect client device 210 to servers 220 and/or 225. For example, network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 205 and client device 210 may include NFC-based communication, cellular network between client device 210 and a carrier, and Internet between the carrier and a backend.

In addition, network 215 may include, without limitation, telephone lines, fiber optics, IEEE Ethernet 802.3, a wide area network, a wireless personal area network, a local area network, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may include a plurality of interconnected networks, such as, for example, the Internet, a service provider's network, a cable television network, corporate networks, such as credit card association networks, and home networks.

In various examples according to the present disclosure, client device 210 of system 200 may execute one or more applications 211, and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 2, any number of devices 210 may be used. Card reader 213 may be configured to read from and/or communicate with contactless card 205. In conjunction with the one or more applications 211, card reader 213 may communicate with contactless card 205. In examples, the card reader 213 may include circuitry or circuitry components, e.g., NFC reader coil, that generates a magnetic field to allow communication between the client device 210 and the contactless card 205.

The application 211 of any of client device 210 may communicate with the contactless card 205 using short-range wireless communication (e.g., NFC). The application 211 may be configured to interface with a card reader 213 of client device 210 configured to communicate with a contactless card 205. As should be noted, those skilled in the art would understand that a distance of less than twenty centimeters is consistent with NFC range.

In some embodiments, the application 211 communicates through an associated reader (e.g., card reader 213) with the contactless card 205.

In some embodiments, card activation may occur without user authentication. For example, a contactless card 205 may communicate with the application 211 through the card reader 213 of the client device 210 through NFC. The communication (e.g., a tap of the card proximate the card reader 213 of the client device 210) allows the application 211 to read the data associated with the card and perform an activation. In some cases, the tap may activate or launch application 211 and then initiate one or more actions or communications with an account server 225 to activate the card for subsequent use. In some cases, if the application 211 is not installed on client device 210, a tap of the card against the card reader 213 may initiate a download of the application 211 (e.g., navigation to an application download page). Subsequent to installation, a tap of the card may activate or launch the application 211, and then initiate (e.g., via the application or other back-end communication) activation of the card. After activation, the card may be used in various transactions including commercial transactions.

According to some embodiments, the contactless card 205 may include a virtual payment card. In those embodiments, the application 211 may retrieve information associated with the contactless card 205 by accessing a digital wallet implemented on the client device 210, wherein the digital wallet includes the virtual payment card. In some examples, virtual payment card data may include one or more static or dynamically generated virtual card numbers.

Server 220 may include a web server in communication with database 235. Server 225 may include an account server. In some examples, server 220 may be configured to validate one or more credentials from contactless card 205 and/or client device 210 by comparison with one or more credentials in database 235. Server 225 may be configured to authorize one or more requests, such as payment and transaction, from contactless card 205 and/or client device 210.

Figure 3A:
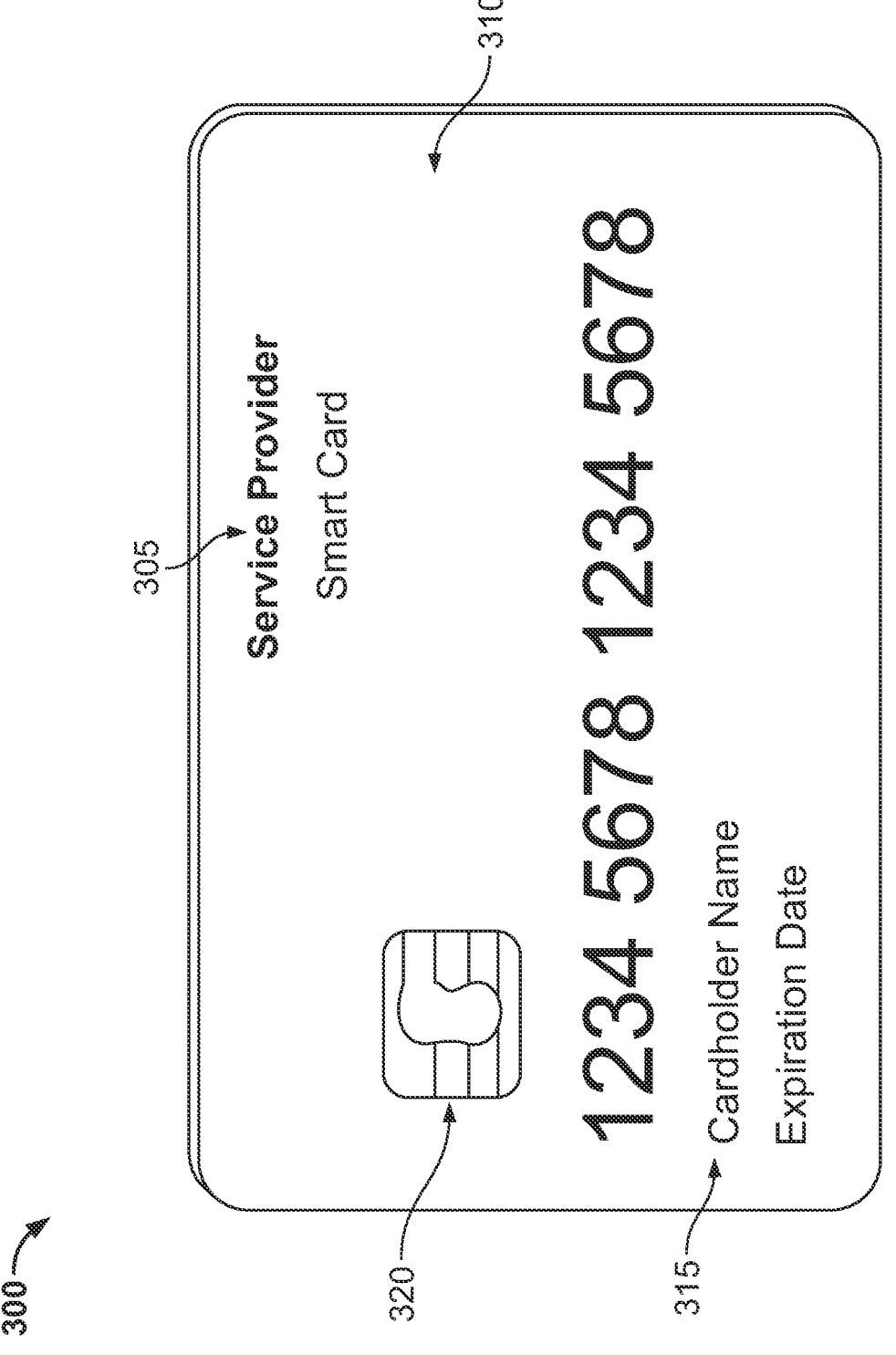
FIG. 3A illustrates an example contactless card in accordance with one or more embodiments.

FIG. 3A illustrates one or more contactless cards 300, which may include a payment card, such as a credit card, debit card, or gift card, issued by a service provider 305 displayed on the front or back of the card 300. In some examples, the contactless card 300 is not related to a payment card, and may include, without limitation, an identification card. In some examples, the payment card may include a dual interface contactless payment card. The contactless card 300 may include a substrate 310, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 300 according to the present disclosure may have different characteristics, and the present disclosure does not require a contactless card to be implemented in a payment card.

The contactless card 300 may also include identification information 315 displayed on the front and/or back of the card, and a contact pad 320. The contact pad 320 may be configured to establish contact with another communication device, such as a user device, smart phone, laptop, desktop, or tablet computer. The contactless card 300 may also include processing circuitry, antenna and other components not shown in FIG. 3A. These components may be located behind the contact pad 320 or elsewhere on the substrate 310. The contactless card 300 may also include a magnetic strip or tape, which may be located on the back of the card (not shown in FIG. 3A).

Figure 3B:
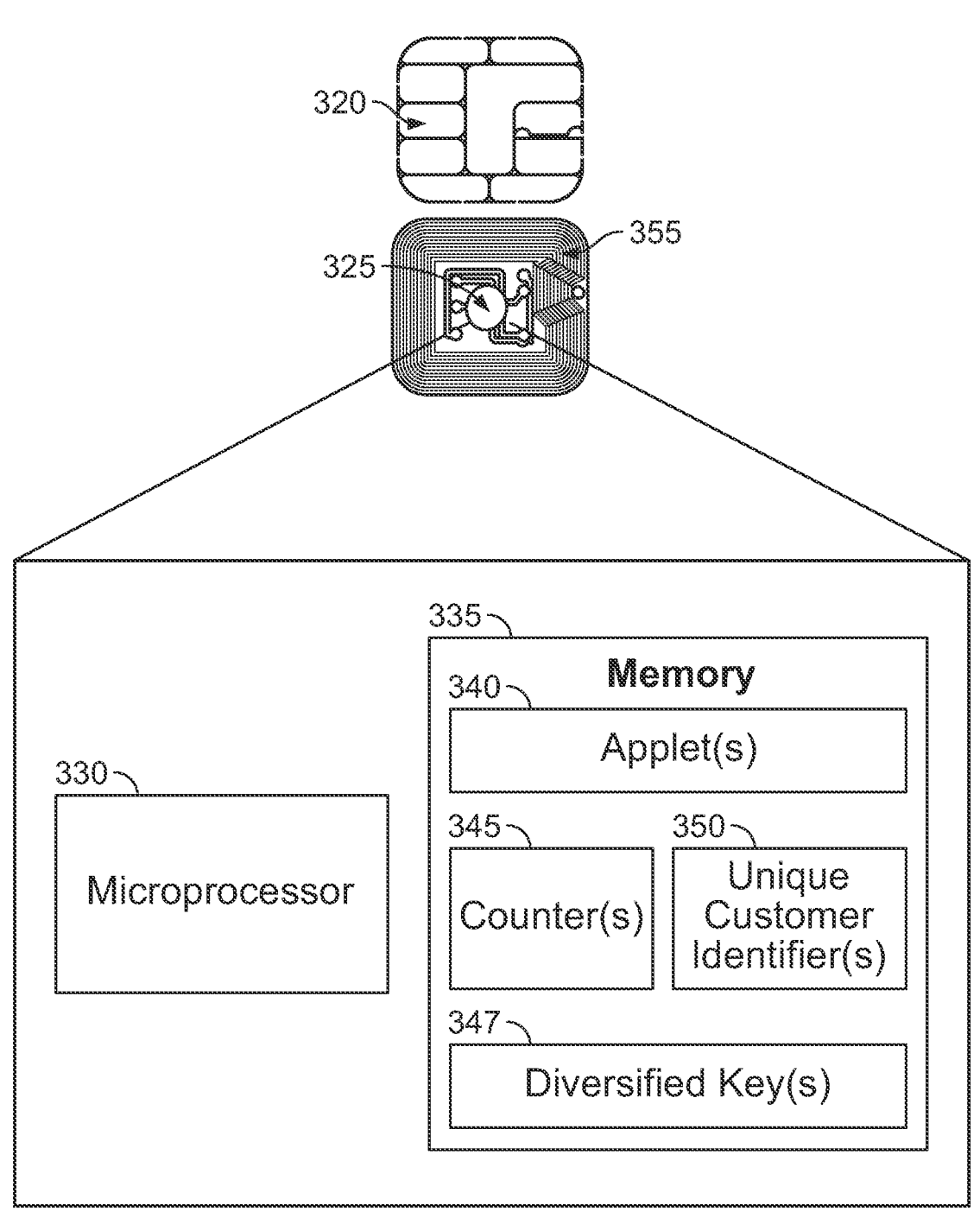
FIG. 3B illustrates an example contact pad of a contactless card in accordance with one or more embodiments.

As illustrated in FIG. 3B, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 335 may be configured to store one or more applets 340, one or more counters 345, one or more diversified keys 347, one or more customer identifiers 350, and other types of suitable data or information. The one or more applets 340 may include one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may include a numeric counter sufficient to store an integer. As will be further described below, the one or more diversified keys 347 may be used to encrypt various information, such as information about the user or customer (e.g., customer identifier 450) to generate cryptogram(s) that can be sent to, for example, a mobile device for at least authentication purposes. The customer identifier 350 may include a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 320 or entirely separate from it, or as further elements in addition to microprocessor 330 and memory 335 elements located within the contact pad 320.

In some examples, the contactless card 300 may include one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that includes a cryptographically secure OTP encoded as an NDEF text tag.

In examples, when preparing to send data (e.g., to a mobile device, to a server, etc.), the contactless card 300 may increment a counter value of a counter of the one or more counters 345. The contactless card 300 may then provide a master key, which may be a distinct key stored on the card 300, and the counter value as input to a cryptographic algorithm, which may also be stored on the card 300 and produces a diversified key as output, which may be one of the diversified keys 347. It is understood that the master key and the counter value is also securely stored in memory of a device or component receiving data from the contactless card 300 so as to decrypt the data using the diversified key that was used by the card to encrypt the transmitted data. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 300 may then encrypt the data (e.g., the customer identifier 350 and any other data) using the diversified key in the form of one or more cryptograms that can be sent to a mobile device, for example, as NFC data exchange format (NDEF) messages. The contactless card 300 may then transmit the encrypted data (e.g., cryptograms) to the mobile device, which can then decrypt the cryptograms using the diversified key (e.g., the diversified key generated by the mobile device using the counter value and the master key stored in memory thereof).

FIG. 4 illustrates an example timing diagram 400 according to one or more embodiments. The timing diagram 400 shows at least the various timing-related features associated with an authentication persistence check and the communication between a user apparatus (e.g., user mobile computing device such as a smartphone, laptop, etc.) and one or more remote backend computing devices (e.g., servers). In examples, the authentication persistence check may be for the second factor authentication, which may otherwise be referred to as a second factor authentication persistence check.

As shown, at time 402 a first factor authentication may be required and performed. As will be further described in detail below, the first factor authentication may involve user ID-password authentication. For example, a user may enter a user ID and password, which may be provided to the backend servers to verify that the entered user ID and password are correct.

At time 404, after successful first factor authentication, a second factor authentication may be required and performed. The second factor authentication may be different type of authentication than the first factor authentication. For example, the second factor authentication may involve the user tapping a contactless card to the user apparatus, which may otherwise be known as one-tap or single tap authentication. The user apparatus, via NFC, receives encrypted user authentication information from the contactless card, e.g., one or more cryptograms containing a user identifier, authentication identifier, etc. The user apparatus may send the cryptogram(s) to remote computing devices, which may be the backed servers, where those servers decrypt the cryptograms to verify whether the user identifier contained therein corresponds to or matches the user. The remote computing devices may then send back an indication to the user apparatus that the user has been successfully authenticated.

At the time of successful second factor authentication (time 406) or near that time, a snapshot of the one or more device settings (e.g., number of apps installed on the phone, types of apps, of the user apparatus and information on one or more user behavioral biometrics (e.g., unique behaviors or patterns related to the use of or interactions with the user apparatus by the user) may be captured. The captured result may be considered a constellation of the device settings and the user behavioral biometrics. The snapshot may be sent or shared with the one or more backend servers for later comparisons to device fingerprints during future persistence checks. While FIG. 4 shows snapshot occurring after the second factor authentication of time 404, it may be understood that the snapshot may occur at the same time or near the same time as second factor authentication. The snapshot may be provided to the one or more remote backend computing devices at time 408.

Thereafter, the second factor authentication persistence check may be performed. The check may be triggered by one of at least: a passage of a specific amount of time or a specific second factor authentication event. The specific amount of time may be predetermined or preset, e.g., a maximum of time that can pass before the user is required to perform the second factor authentication again. The second factor authentication event may be any action or event, either caused or triggered by the user, that requires the second factor authentication, such as high-risk transactions.

At time 410, a stability check or verification on the user apparatus may be performed. The user apparatus may request and cause the one or more backend remote computing devices to conduct the stability check by communicating with one or more mobile operator servers associated with a mobile operator network (MNO), e.g., via application programming interface (API) calls. In other instances, the one or more remote backend servers automatically initiate or may be automatically caused to perform the stability check in response to the second factor authentication persistence check, an indication of which may be provided to the remote backend servers by the user apparatus. One example of the stability check is an MNO stability check, which involves the backend computing devices to request and receive indication from the mobile operator servers that the user apparatus has not substantially changed, e.g., the SIM card of the user apparatus remains the same, the telephone number associated with the user apparatus remains the same, etc.

At time 412, in response to a determination that the user apparatus is stable, the one or more backed computing devices may request that the user apparatus perform device fingerprinting. Alternatively, at time 412, in response to a determination that the user apparatus is unstable, the one or more backend servers may return a negative result for the persistence check and require that the user to reauthenticate via the second factor authentication (not shown).

At time 414, the user apparatus may perform device fingerprinting. As will be further described below, device fingerprinting may be a process in which a current constellation of the device settings of the user apparatus and the one or more user behavioral biometrics associated with the use or interaction with the user apparatus is determined. The current constellation may be provided to the one or more backend computing devices at time 416.

At time 418, the backend computing devices may perform a drift analysis. For example, the drift analysis may involve at least determining whether the current constellation of the user apparatus that was provided at time 416 is within a predetermined drift threshold relative to the snapshot taken at time 406. As will be further described in detail below, the drift threshold is a maximum amount of deviation or drift between the current constellation and the snapshot that can be allowed. If the current constellation is within the predetermined drift threshold, the backend computing devices may provide indication at time 420 to the user apparatus that the second factor authentication may be allowed to persist. If the current constellation is outside the drift threshold, the backend computing devices may return a negative persistence check result and the user would be required to reauthenticate via the second factor authentication.

Figure 5:
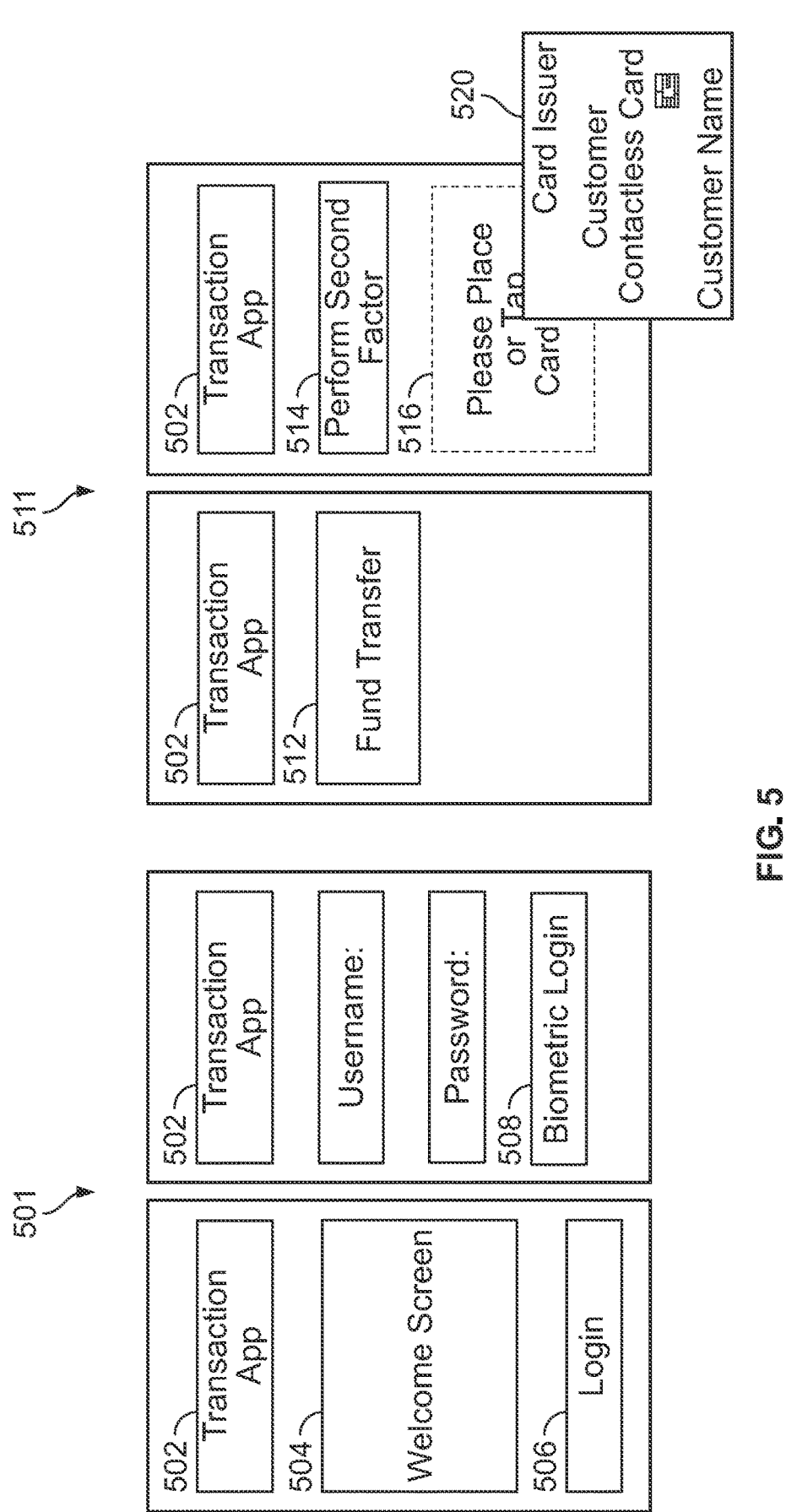
FIG. 5 illustrates example first factor and second factor authentications in accordance with one or more embodiments.

FIG. 5 illustrates example first factor and second factor authentications according to one or more embodiments. As shown, an example of the first factor authentication 501 may involve a user inputting a user ID and password. As further shown, an example of the second factor authentication 511 may involve a user placing or tapping a contactless card to the user apparatus, which may be referred to as single tap or one-tap contactless card authentication.

In examples, a user may be required to authenticate via the first factor authentication to login to a transaction app. The user may open transaction app interface 502, which displays a welcome screen 504 and login icon 506. When the login icon 506 is selected, fields for the user ID and password are presented to the user for user ID and password entry. The interface may also display an icon 508 for logging in to the transaction app via biometric authentication, such as user fingerprint authentication.

When the login ID and password are entered by the user, the user apparatus may send the login information to one or more remote computing devices (e.g., backend authentication servers) that are at least configured to determine and verify that the login ID and password combination is valid and associated with the user. If valid, the user may gain access to the transaction app 502. It may be understood that the first factor authentication may be any type of authentication, such as biometric, passcode, PIN, etc., and not limited to just user ID and password authentication.

Once the user has logged in to the transaction app 502, the user may want to perform a specific transaction, e.g., transfer money to an account. The sum of money being transferred may be large enough to trigger a high-risk indication or warning by the transaction app 502. As described above, this high-risk indication or warning may be considered the authentication event (specifically, in this example, may be considered the second factor authentication event since high-risk fund transfers may require second factor authentication).

As shown, for example, the user may select the fund transfer icon 512 to initiate and perform the transfer. Thereafter, a graphic 514 may display that the user is required to perform single tap or one-tap authentication. The transaction app 502 may display a dashed box 516 indicating where the user should place or tap the user's contactless card 520 to the user apparatus. When the contactless card 520 is brought near the user apparatus to a requisite communication distance, NFC may be established and the NFC reader of the user apparatus may read or receive at least one or more cryptograms from the card 520. The cryptograms may contain various types of encrypted information, such as user authentication information, which may be any indicator or identifier (e.g., unique alphanumeric identifier, code, personally identifiable information, etc.) or the unique customer identifier described above with respect to FIG. 3B that identifies the authorized user of the card.

In embodiments, the user apparatus may receive and send the one or more cryptograms to the one or more remote computing devices, such as backend authentication servers. On the backend server side, the server computers may decrypt the cryptogram(s) and determine whether the user authentication information contained therein actually corresponds to the user. One example of this matching process may involve the backend servers correlating the information of user that has logged into the transaction app to the user authentication information contained in the cryptograms. Thereafter, the backend server computers may send the user apparatus indication of successful authentication. In other instances, it may be understood that one or more cryptograms from the contactless card may be decrypted on the user apparatus side to determine whether the user is an authorized user of the contactless card.

FIG. 6 illustrates an example snapshot 600 of the device settings and user behavioral biometrics at time of second factor authentication according to one or more embodiments. At the time of successful second factor authentication or near such time, a snapshot of a constellation of the device settings of the user apparatus and the user behavioral biometrics. It may be understood that the snapshot 600 may include only the device settings, only the user behavioral biometrics or biometric data, or both the device settings and the behavioral biometrics.

In examples, the one or more device settings may include: (i) one or more applications installed on the apparatus, (ii) one or more wireless devices connected to the apparatus via wireless connection, (iii) a list of saved wireless devices connectable to the apparatus, (iv) a network that the apparatus is connected to, (v) a list of saved networks the apparatus is connectable to, (vi) version of an operating system on the apparatus, (vii) one or more setting preferences, etc.

As shown, sub-constellation 602 indicates that, at the time of successful second factor authentication, the device settings were that there were eight apps installed, three of which were social media apps, three were entertainment apps, one was a food app, and one was a map app. Moreover, there were two wireless devices connected to the user apparatus (e.g., wireless earbuds, smartwatch) and that there were five different types of devices saved to the wireless device connection list. The user apparatus was not connected to Wi-Fi at the time of snapshot, but there were four different types of wireless networks saved to the Wi-Fi network list. Further, the version of the operating system was 2.0 and the display setting was set such that hibernation mode kicks in after three minutes and the notification setting was set at vibration.

In further examples, the one or more user behavioral biometrics or data may be received via one or more sensors (e.g., gyroscope, accelerometer, camera, microphone, etc.) or one or more interfaces of the user apparatus and may be analyzed by the user apparatus. The one or more user behavioral biometrics or biometric data may include: (i) how the user physically holds the apparatus, (ii) how the user swipes or interacts with a display interface, (iii) how the user uses keyboard or gestural shortcuts, (iv) how the user types words, (v) a duration of time for the user to type words, (vi) how the user transitions between two or more icons, (vii) typing speed of user, (viii) typing cadence of user, etc.

As illustrated, sub-constellation 604 indicates that, at the time of successful second factor authentication, various aspects the user's unique behavior or interaction with the user apparatus are that the user rarely holds the user apparatus horizontally, always swipes left to right, has no gestural shortcuts, types approximately 55 words per minute on the user apparatus, the user presses the home button to transition between apps and rarely uses the app tabs to transition, and selects app 606 before app 608 a majority of the time.

It may be understood that user behavioral biometrics broadly refers to identifying an individual based on the unique way(s) the individual interacts or uses with a computing device, such as measuring how the user holds the device, how the individual swipes the screen, which keyboard or gestural shortcuts are used, and building a unique behavioral profile of the individual, etc. The user behavioral biometrics are based on human behavioral patterns consisting of a variety of distinctive actions or behaviors (or semi-behaviors) that make up the individual and may reflect that individual's observable habits and micro-habits.

Figure 7:
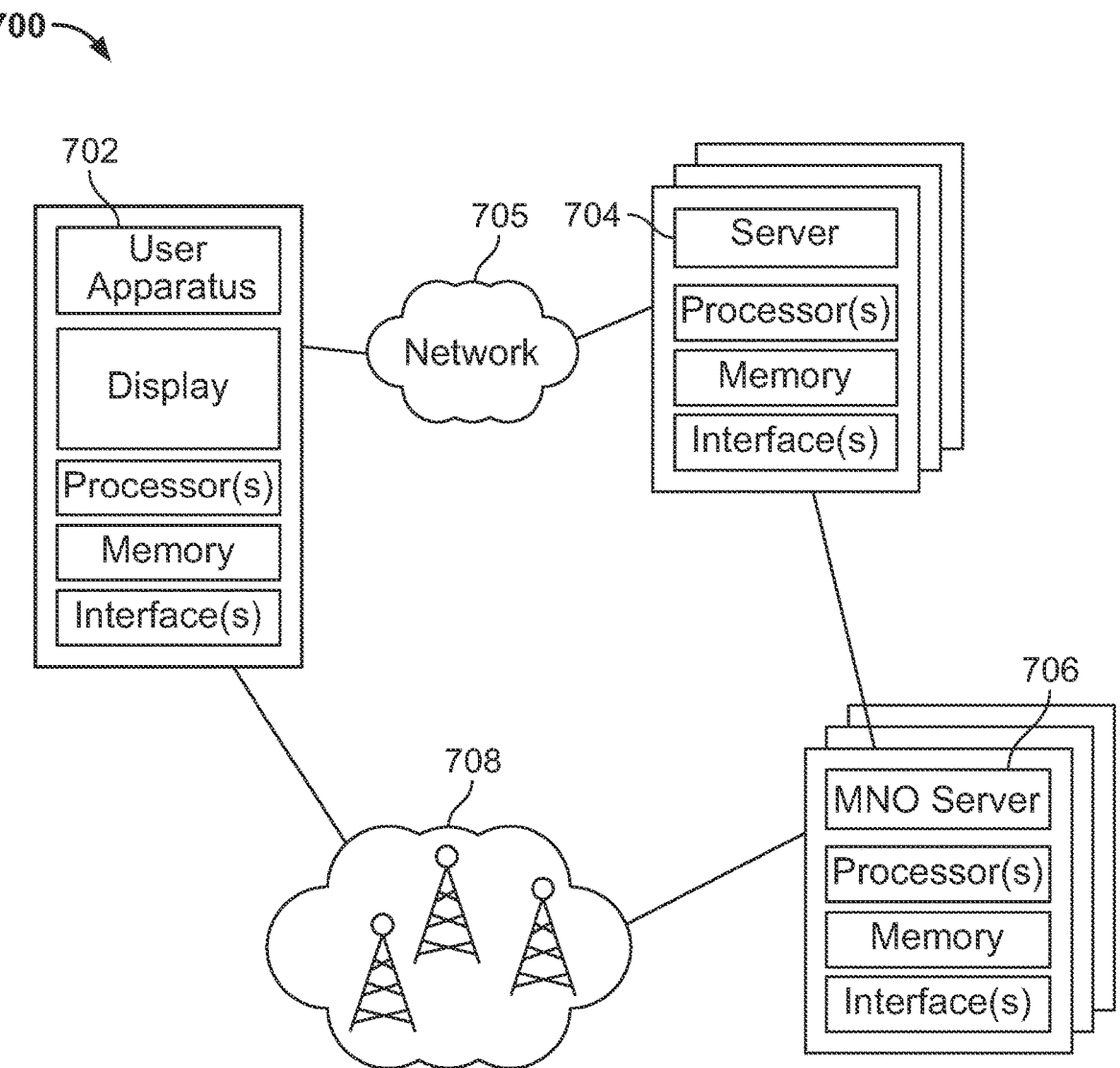
FIG. 7 illustrates an example stability check of a user apparatus in accordance with one or more embodiments.

FIG. 7 illustrates an example stability check 700 of a user apparatus according to one or more embodiments. As described above, the stability check of the user apparatus may be performed to at least confirm that the user associated with the user apparatus has not changed. In examples, the stability check may be a mobile network operator (MNO) verification.

In embodiments, the user apparatus 702 may cause the MNO verification to be initiated. The MNO verification may be initiated or triggered (may otherwise be referred to as a "MNO verification trigger"), for example, when the first instance of the second factor authentication has been performed and (i) when an authentication event occurs or is requested (e.g., high-risk transaction, high amount transfer in the transaction app) or (ii) if a specific amount of time has passed after the first instance of the second factor authentication, e.g., which can be based on or adjusted in accordance with various backend security procedures or protocols.

As shown, the user apparatus 702 may communicate or provide information to the one or more backend servers 704 via network 705 that MNO verification is to be performed based on the above described MNO verification trigger. The backend servers 704 may then establish communication and communicate with one or more MNO computing devices 706, e.g., MNO servers, which may be wirelessly communicating with one or more cell towers 708 or any type of wireless communication devices (e.g., base stations). Because the user apparatus 702 may also be connected to and wireless communicating with the one or more cell towers 708, the MNO computing devices 706 may receive various types of mobile-network-based information about the user apparatus 702 via the cell towers 708, such as what (e.g., model number, identifier) subscriber identity (or identification) module (SIM) card of the user apparatus 702 is being used to communicate with the cell towers 708, whether the SIM card has been changed or replaced, phone number(s) or any other user information associated with the SIM card, whether the phone number(s) or the other user information has changed, etc.

The one or more MNO computing devices 706 may provide these types of information back to the backend servers 704, which may determine based on this information, whether the user apparatus 702 is "stable" and remains unchanged in terms of the MNO-based characteristics. If the SIM card has been changed or replaced, or if the phone number has changed, etc., it is presumed that the user apparatus 702 has changed users, and thus, the backend servers 704 may determine that the user apparatus 702 is unstable. The result of the stability check is then sent to the user apparatus 702 so that the user apparatus can perform device fingerprinting.

It may be understood that the MNO computing devices 706 and cell towers 708 are components external to the system in which the backend servers 704 reside and may be owned or operated by a third-party mobile network operator. A mobile network operator may be understood to be a wireless service provider, carrier, cellular company, mobile network carrier, etc. that provides wireless communications services and may own or control all elements necessary to sell and deliver services to end users including radio spectrum allocation, wireless network infrastructure, back haul infrastructure, etc.

FIG. 8 illustrates an example device fingerprinting according to one or more embodiments. As described above, a user apparatus may receive a request or an indication from one or more backend servers to conduct device fingerprinting. Device fingerprinting involves the user apparatus capturing the current constellation 800 of the device settings of the user apparatus and the user behavior biometrics. It may be understood that device fingerprinting and capturing the current constellation 800 may be similar to the process of taking the snapshot 600 described above with respect to FIG. 6.

As shown, sub-constellation 802 indicates that, at the time of device fingerprinting, the device settings were that there were ten apps installed, three of which were social media apps, three were entertainment apps, one was a food app, one was a map app, one was a TV app, and one was a photo app. Moreover, there was one wireless device connected to the user apparatus (e.g., smartwatch) and that there were six different types of devices saved to the wireless device connection list. The user apparatus was not connected to Wi-Fi at the time of device fingerprinting, but there were five different types of wireless networks saved to the Wi-Fi network list. Further, the version of the operating system was 2.0 and the display setting was set such that hibernation mode kicks in after three minutes and the notification setting was set at silent.

As further shown, sub-constellation 804 indicates that, at the time of device fingerprinting, various aspects the user's unique behavior or interaction with the user apparatus are that the user rarely holds the user apparatus horizontally, always swipes left to right, has no gestural shortcuts, types approximately 50 words per minute on the user apparatus, the user presses the home button to transition between apps and rarely uses the app tabs to transition, selects app 606 before app 608 a majority of the time and similarly selects app 806 before app 808. As described above, the captured constellation 800 of the device fingerprinting may be provided to the one or more backend servers for drift analysis.

FIG. 9 illustrates an example drift analysis 900 according to one or more embodiments. For example, the drift analysis 900 may involve at least (i) comparing the captured result of the current constellation 800 at the time of device fingerprinting and the snapshot 600 taken at the time of the successful second factor authentication and (ii) determining whether the differences between the current constellation 800 and the snapshot 600 are within predetermined drift threshold(s). The predetermined drift threshold limit may be a threshold deviation limit of the one or more device settings and/or the one or more user behavioral biometrics from the time of the second factor authentication to the time the device fingerprinting, e.g., a limit on how much of the device settings and/or user behavioral biometrics can change or deviate within that time span.

According to embodiments, examples of the types of deviations analyzed may include change(s) in the number of apps, change in the types of apps, change in the number of wireless devices connected to the user apparatus, change in the types of wireless devices connected to the user apparatus, change in which network the user apparatus is connected to, change in the saved list of networks that the apparatus can connect to, change in the version of the operating system, change in display settings, change in notification settings, etc.

For example, the predetermined drift threshold may set such that the difference in the number of changed apps cannot exceed three, the difference in the number of changed connected devices cannot exceed three, the difference in the number of changed wireless networks that the user apparatus can connect to cannot exceed three, the version of the operating system cannot change. Other factors may also be analyzed, such as, if the types of the apps that have been added, removed, modified or if the changed display, notification, or other settings are completely or vastly different from snapshot 600 to the current constellation 800, then such differences may exceed and violate the predetermined drift threshold. A similar type of analysis may be applied to the differences in the user behavioral biometrics. For instance, if the types of behavior remain similar or substantially the same, then the changes would fall within the predetermined drift threshold. It may be understood that a machine learning model or neural network may be used to perform the drift analysis, where the machine learning model or neural network may be trained using training data or datasets that contain examples of various drift violations or examples of acceptable drift, etc.

As illustrated, the device setting changes between the snapshot 600 and current constellation 800 are shown in underline in current constellation 800, e.g., the number of apps increased from eight to ten (difference of two), the number of wireless devices connected to the user apparatus decreased from two to one (difference of one), the number of wireless devices saved to the wireless device list increased from five to six (difference of one), the number of saved Wi-Fi networks increased from four to five (difference of one), and the notification setting changed from vibration to silent.

Moreover, the user behavioral changes between snapshot 600 and current constellation 800 are shown in underline, e.g., typing speed decreased from 55 words per minute to 50 words per minute, and that the user selects app 806 before selecting app 808, which is a new behavior metric. The drift analysis 900 may reveal that all device setting changes are within the above-defined drift thresholds. Importantly, the version of the operating system remained the same. The analysis may further reveal that all user behavior changes remain substantially unchanged and that the addition of the new behavior is similar or in line with the behavior previously observed.

Accordingly, based on the drift analysis 900, it may be determined that the changes between the snapshot 600 and the current constellation 800 are within the predetermined drift threshold. Thus, the second factor authentication described above (e.g., the single tap or one-tap authentication) may be allowed to persist for a predetermined duration of time until a subsequent authentication persistence check.

It may be understood that deviations in user behavior may be given more weight than deviations in device settings when determining drift violations. For example, if the user always swipes from the left to right direction (e.g., 99 percent of the time), but now more often swipes right to left, that may indicate that the user may not be the originally authenticated user. In other situations, changes in device settings may be given more weight, e.g., if the apps completely change in type (apps that are majority non-social media change to mostly social media apps). It may further be understood that the predetermined drift threshold may be dependent on at least the risk level of the user action, e.g., higher risk level may warrant more stringent or tighter thresholds, lower risk level may warrant lax or loose thresholds.

Figure 10:
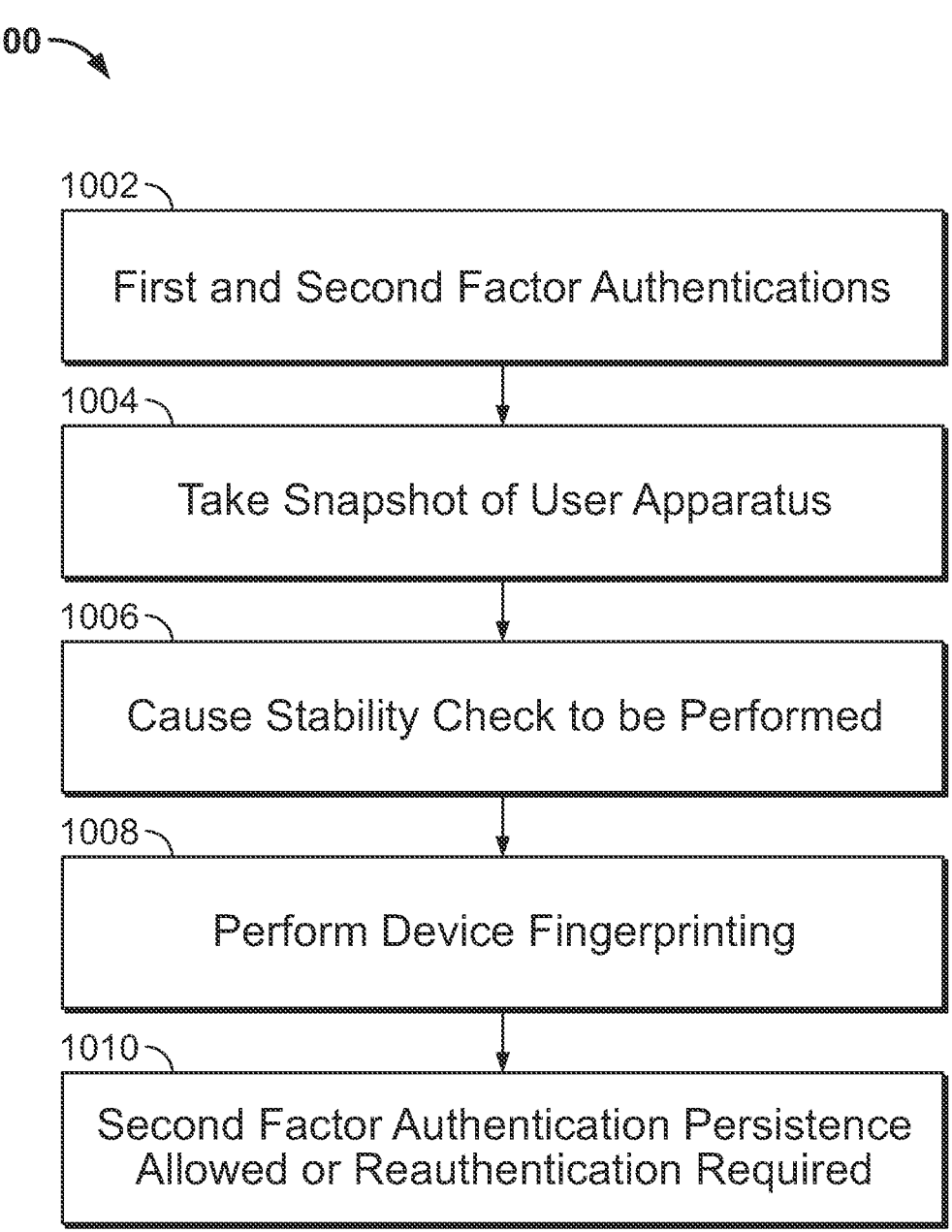
FIG. 10 illustrates an example flow diagram in accordance with one or more embodiments.

FIG. 10 illustrates an example flow diagram 1000 according to one or more embodiments. The flow diagram 1000 is related to at least performing an authentication persistence check and, based on the check, either allowing or disallowing a previously successful authentication to persist. It may be understood that the blocks of the flow diagram 1000 and the features described therein are not required to be performed in any particular order. Moreover, it may be understood that the flow diagram 1000 and the features described therein may be executed by one or more processors or any suitable computing device or computing architecture described herein.

At block 1002, first and second factor authentications may be performed. The first factor authentication may be based on something the user knows, e.g., ID and password input. The second factor authentication may be triggered by a second factor authentication event, such as the transfer of a large amount of money. The second factor authentication may be the single or one tap of the user's contactless smart card, as described above.

At block 1004, a snapshot of the constellation of the device settings of the user apparatus and/or one or more user behavioral biometrics may be taken at the time of successful second factor authentication (or first factor authentication depending on which authentication will persist) at block 1002. The snapshot may be provided to one or more remote backend computing devices (e.g., backend servers associated with a transaction app platform), which may be later used by the backend computing devices as a reference point for determining how much the device settings and behavioral metrics have changed.

At block 1006, a stability check on the user apparatus may be caused to be performed. The check may be caused by the apparatus or may be automatically initiated by the backend computing devices. The stability check may be triggered: when a specific period of time has passed since the first instance of successful authentication or based on the occurrence of an authentication event (e.g., requesting to transfer a large amount of funds via the transaction app). The stability check may be an MNO verification, which involves an MNO providing verification that the user apparatus has not significantly changed, e.g., SIM card has not changed. The result of the MNO verification may be provided to the one or more backend computing devices.

At block 1008, in response to a successful stability check, the backend computing devices may request the user apparatus to perform device fingerprinting. As described above, device fingerprinting may be similar to the snapshot taken at block 1004, except it is done at the time of the device fingerprinting. The result of the device fingerprinting is a current constellation of the device settings of the user apparatus and/or the one or more user behavioral biometrics. The current constellation may be provided to the backend computing devices for drift analysis, as described in detail above.

At block 1010, the user apparatus may receive the result of the drift analysis from the backend computing devices, which indicates that the authentication (e.g., second factor authentication) can or cannot persist. If it can persist, the user is not required to perform the single tap or one tap authentication again and the transfer of the funds can proceed. If it cannot persist, the user is asked to reauthenticate via the single tap or one tape authentication.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled,"

however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/ or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:

memory configured to store instructions;

one or more processors configured to execute the stored instructions that, when executed, cause the one or more processors to:

perform multifactor authentication, wherein one factor includes the one or more processors to establish a short-range wireless communication with a contactless card, receive data from the contactless card, send the data to a system to authenticate, and receive an indication that the contactless card is authentic;

determine a snapshot of the apparatus at a first time;

perform a stability check on the apparatus to determine that the apparatus is stable, wherein the stability check comprises a mobile network operator (MNO) verification;

perform device fingerprinting on the apparatus at a second time following a determination that the apparatus is stable;

compare the fingerprinting to the snapshot to determine whether the fingerprinting meets a predetermined requirement;

allow the multifactor authentication to persist for a predetermined time period if the fingerprinting meets the predetermined requirement; and reauthenticate the user if the fingerprint does not meet the predetermined requirement.

2. The apparatus of claim 1, wherein the data is comprised in a message generated by the contactless card applying a first session key to a shared secret to generate a message access code (MAC) cryptogram and applying a second session key to the MAC cryptogram and a random number to generate the message.

3. The apparatus of claim 1, wherein a second factor of the multifactor authentication comprises an identifier and a password for an application, a biometric input, a passcode, or a personal identification number (PIN).

4. The apparatus of claim 1, wherein the snapshot comprises one or more device settings, one or more biometric inputs, or a combination thereof.

5. The apparatus of claim 1, wherein the fingerprint comprises one or more device settings, one or more biometric inputs, or a combination thereof.

6. The apparatus of claim 1, wherein the predetermined requirement is an allowed amount change between the snapshot and fingerprint.

7. A computer-implemented method comprising:

performing multifactor authentication by an apparatus comprising a memory and one or more processors configured to execute one or more instructions stored in the memory, wherein one factor includes:

establishing, by the apparatus, a short-range wireless communication with a contactless card, receiving, by the apparatus, data from the contactless card, sending, by the apparatus, the data to a system to authenticate, and receive, by the apparatus, an indication that the contactless card is authentic;

determining a snapshot of the apparatus at a first time;

performing a stability check to determine that the apparatus is stable, wherein the stability check comprises a mobile network operator (MNO) verification;

performing device fingerprinting on the apparatus at a second time following a determination that the apparatus is stable;

comparing the fingerprinting to the snapshot to determine whether the fingerprinting meets a predetermined requirement;

allowing the multifactor authentication to persist for a predetermined time period if the fingerprinting meets the predetermined requirement; and reauthenticating the user if the fingerprint does not meet the predetermined requirement.

8. The computer-implemented method of claim 7, wherein the data is comprised in a message generated by the contactless card applying a first session key to a shared secret to generate a message access code (MAC) cryptogram and applying a second session key to the MAC cryptogram and a random number to generate the message.

9. The computer-implemented method of claim 7, wherein a second factor of the multifactor authentication comprises an identifier and a password for an application, a biometric input, a passcode, or a personal identification number (PIN).

10. The computer-implemented method of claim 7, wherein the snapshot comprises one or more device settings, one or more biometric inputs, or a combination thereof.

11. The computer-implemented method of claim 7, wherein the fingerprint comprises one or more device settings, one or more biometric inputs, or a combination thereof.

12. The computer-implemented method of claim 7, wherein the predetermined requirement is an allowed amount change between the snapshot and fingerprint.

13. A non-transitory computer-readable storage medium, the computer-readable storage medium including instructions that when executed by a computer, cause the computer to:

perform multifactor authentication, wherein one factor includes:

establish a short-range wireless communication with a contactless card, receive data from the contactless card, send the data to a system to authenticate, and receive an indication that the contactless card is authentic;

determine a snapshot of the apparatus at a first time;

perform a stability check to determine that the apparatus is stable, wherein the stability check comprises a mobile network operator (MNO) verification;

perform device fingerprinting on the apparatus at a second time following a determination that the apparatus is stable;

compare the fingerprinting to the snapshot to determine whether the fingerprinting meets a predetermined requirement;

allow the multifactor authentication to persist for a predetermined time period if the fingerprinting meets the predetermined requirement; and reauthenticate the user if the fingerprint does not meet the predetermined requirement.

14. The computer-readable storage medium of claim 13, wherein the data is comprised in a message generated by the contactless card apply a first session key to a shared secret to generate a message access code (MAC) cryptogram and applying a second session key to the MAC cryptogram and a random number to generate the message.

* * * * *